April 25, 1967  H. W. McCLARNEY  3,315,327
MASONRY CONSTRUCTING APPARATUS
Filed Jan. 19, 1965  10 Sheets-Sheet 1

INVENTOR.
Harry W. McClarney
BY Wm. T. Wofford
Attorney

April 25, 1967 H. W. McCLARNEY 3,315,327
MASONRY CONSTRUCTING APPARATUS
Filed Jan. 19, 1965 10 Sheets-Sheet 2
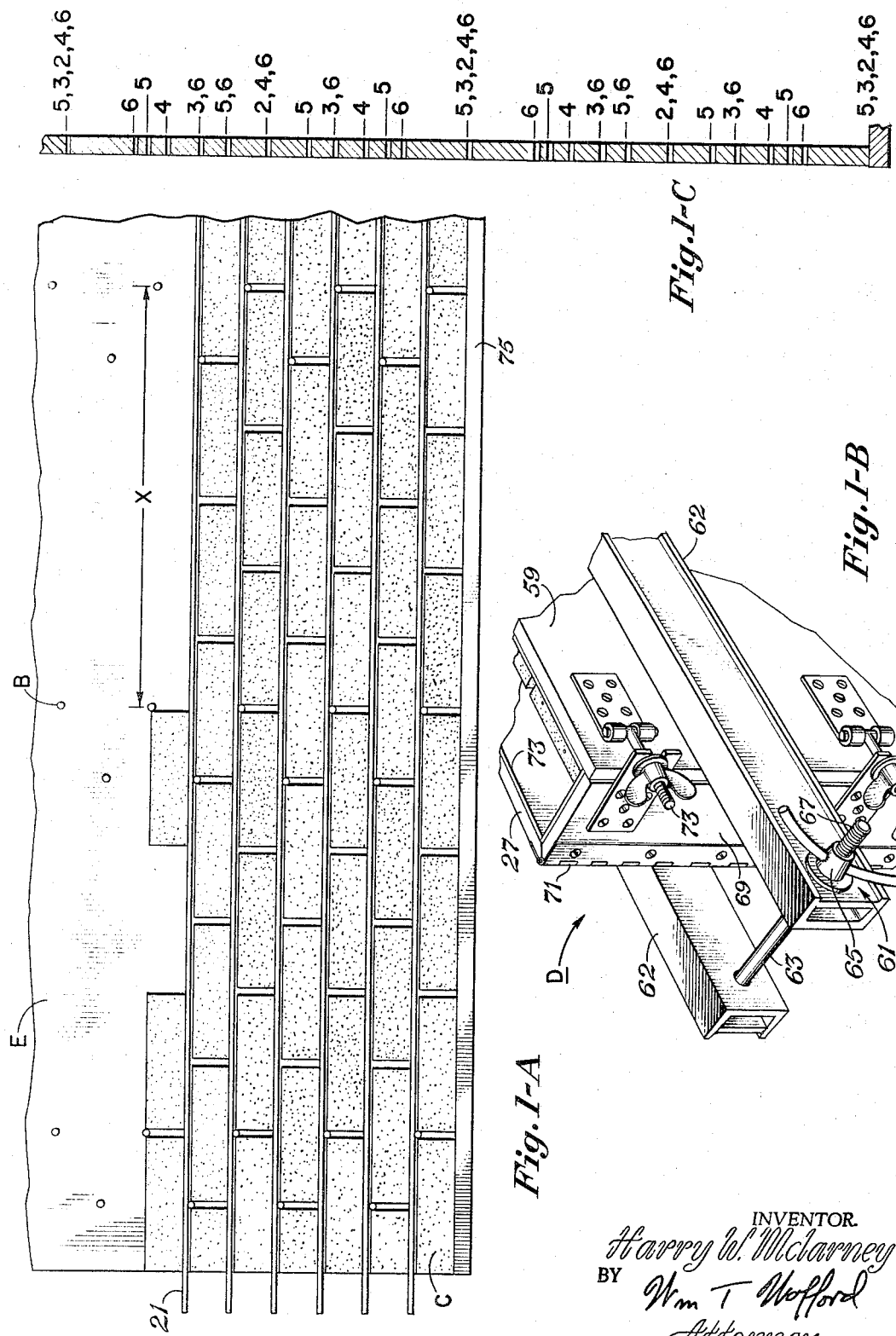
INVENTOR.
Harry W. McClarney
BY Wm T Wofford
Attorney

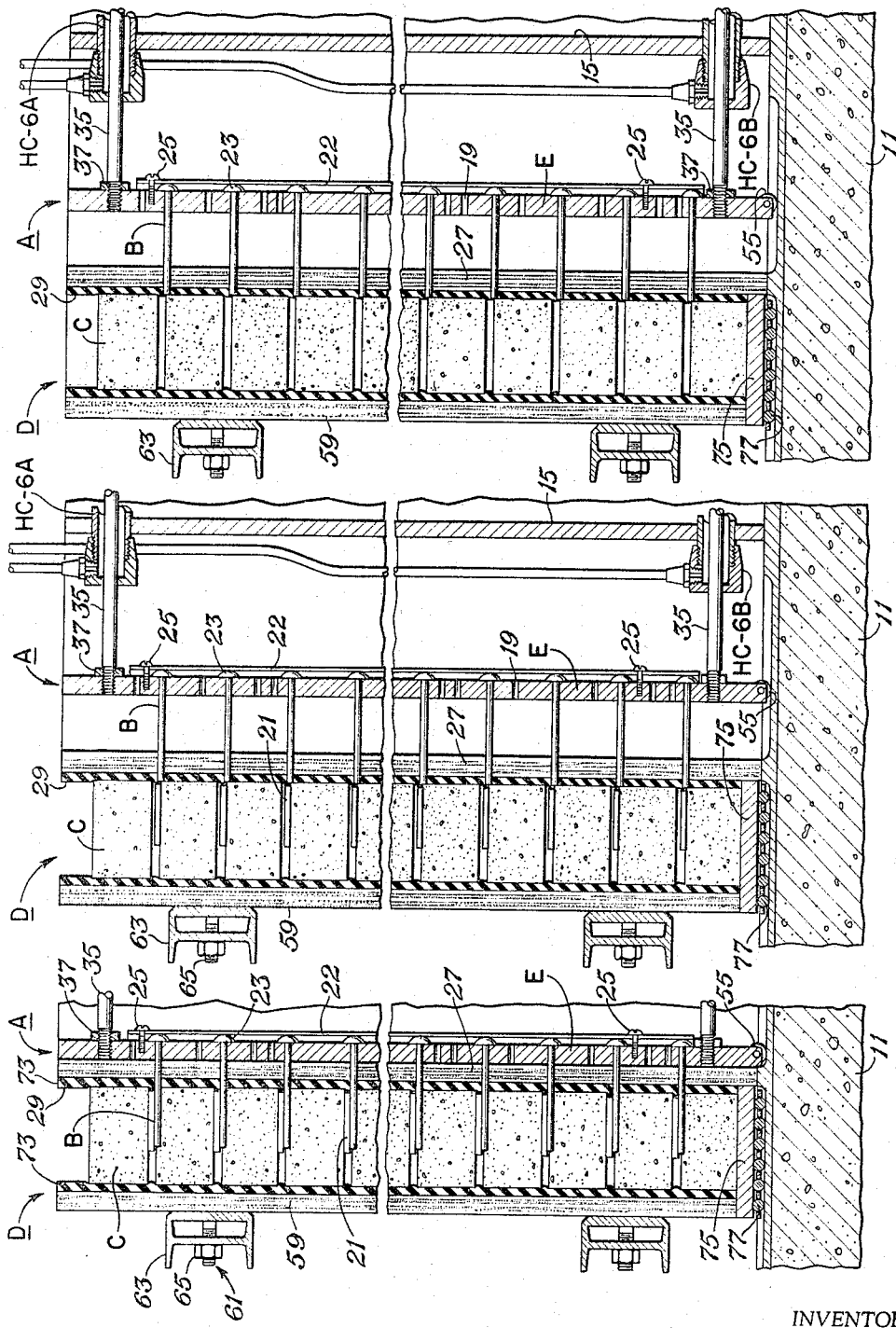

April 25, 1967  H. W. McCLARNEY  3,315,327
MASONRY CONSTRUCTING APPARATUS
Filed Jan. 19, 1965  10 Sheets-Sheet 4

INVENTOR.
Harry W. McClarney
BY Wm T Wofford
Attorney

INVENTOR.
Harry W. McClarney
BY Wm. T. Wofford
Attorney

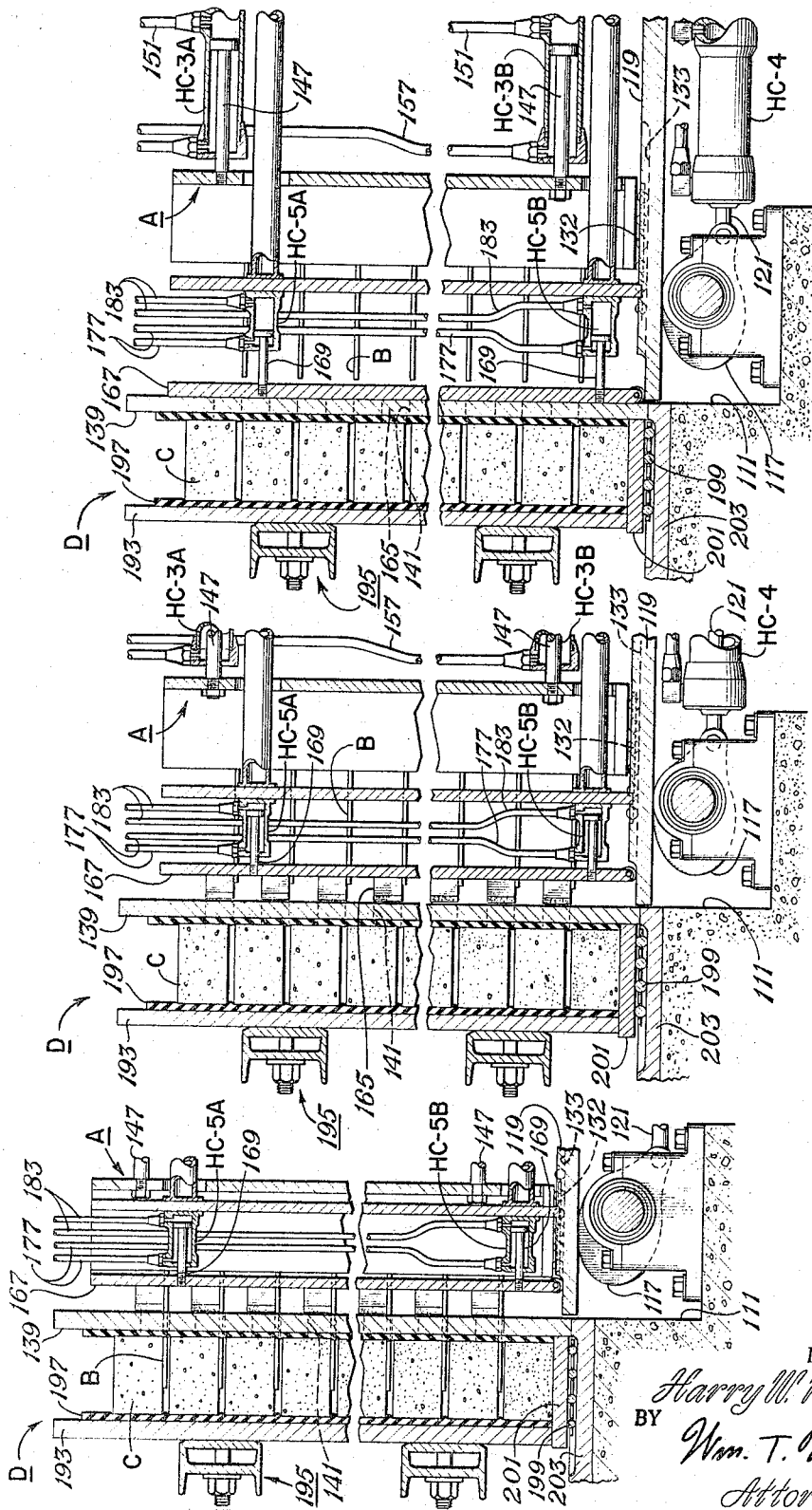

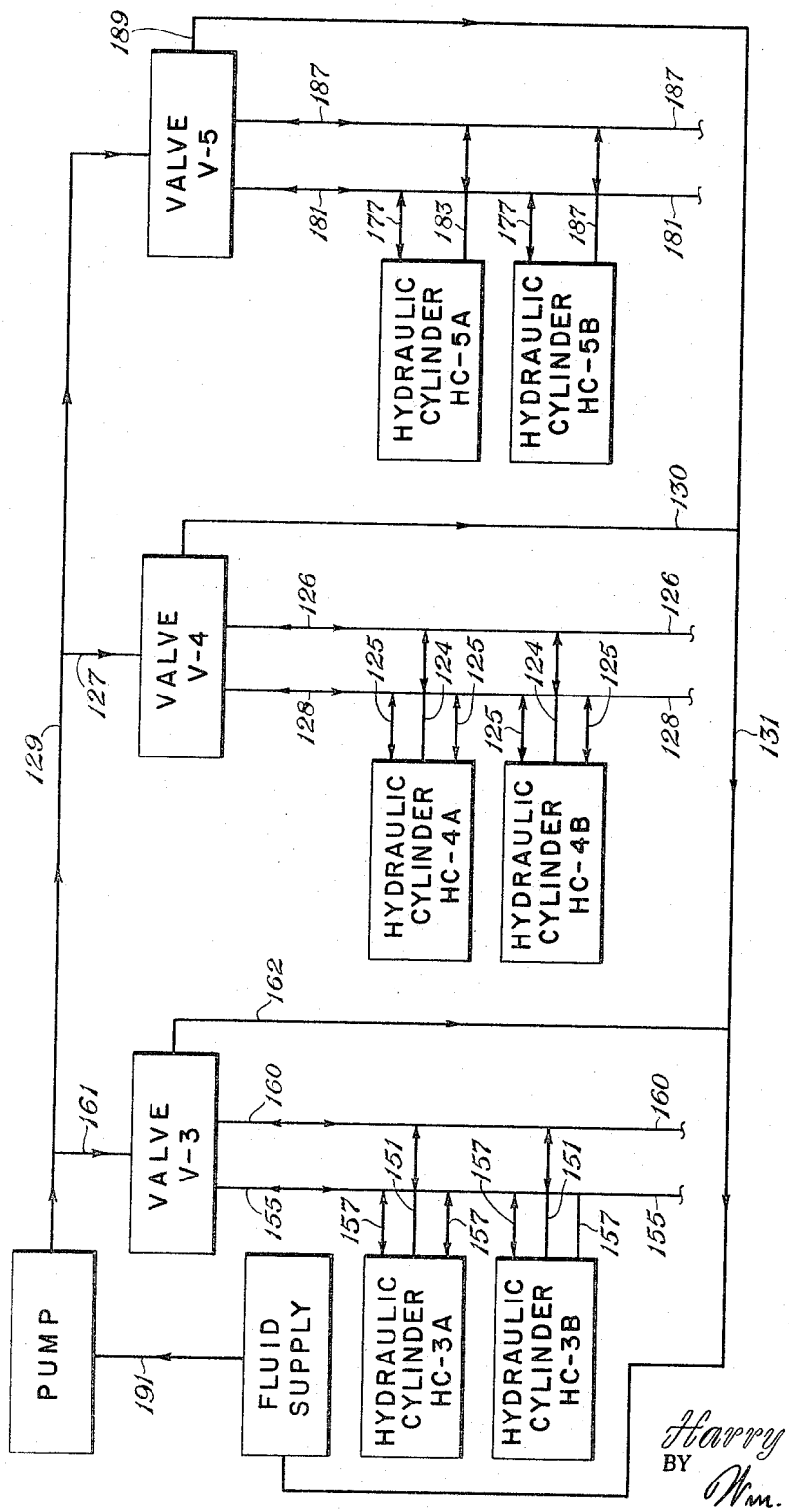

United States Patent Office 3,315,327
Patented Apr. 25, 1967

3,315,327
MASONRY CONSTRUCTING APPARATUS
Harry W. McClarney, 5621 Westlawn,
Waco, Tex. 76710
Filed Jan. 19, 1965, Ser. No. 426,642
36 Claims. (Cl. 25—1)

My invention relates in general to apparatus for constructing masonries and in particular to such apparatus wherein improved means are provided for positioning the individual masonry units in predetermined spaced relationship and for holding these units preparatory to the filling of the spaces separating the units with a cementatary bonding substance. The terms "masonry" and "masonries" are used hereinafter to refer to those structures which are built by a mason, and will include those structures having materials such as stone, brick, tile, or any other materials used by masons. The term "unit" will be used to refer to a brick, a stone, a piece of tile, or the like which is used in the construction of masonries. A "cementatory bonding substance" is a material such as mortar, or any other substance which is used to join the above units to form a masonry.

I have disclosed other types of apparatus which may be used to construct masonries in the following copending applications: (1) Ser. No. 306,766, filed Sept. 5, 1963, now Patent No. 3,210,445 issued Oct. 5, 1965; (2) Ser. No. 321,249, filed Nov. 4, 1963, now Patent No. 3,232,589 issued Mar. 8, 1966. The present invention is directed to improved types of masonry constructing apparatus.

It is, therefore, the general object of my invention to provide improved masonry constructing apparatus.

Another object of my invention is to provide masonry constructing apparatus in which there are improved means for positioning masonry units in selected spaced relationship.

Another object of my invention is to provide masonry constructing apparatus having unit positioners and unit holders that are cooperatively arranged to produce improved masonry constructing apparatus.

Another object of my invention is to provide masonry constructing apparatus in which there are improved means coacting with unit holder apparatus for sealing same against egress of the cementatory bonding substance.

These and other objects are effected by my invention as will be apparent from the following description taken in accordance with the accompanying drawings, forming a part of this application, in which:

FIG. 1 is a side elevational view in section which shows a masonry constructing apparatus that in this instance is capable of forming simultaneously two vertical masonry walls. The unit positioners (which include a multiplicity of horizontally extending pins) are fully visible in this view while only a portion of the unit holders (referred to hereinafter as being of the clamping wall type) are visible.

FIG. 1-A is a fragmentary side elevational view that illustrates a preferred form of unit positioner apparatus.

FIG. 1-B is a fragmentary perspective view of an end portion of a preferred form of unit holder apparatus which may be utilized with the unit positioner apparatus of FIG. 1-A.

FIG. 1-C is a schematic view of a coursing adapter structure, showing a locator arrangement which conveniently enables the use of the masonry constructing apparatus with different sizes of units.

FIGS. 2, 3 and 4 are fragmentary side elevational views in section which illustrate in sequence a preferred mode of operation of the masonry constructing apparatus of FIG. 1-A;

FIGS. 10, 11 and 12 are fragmentary and sectional side elevational views which illustrate in sequence a preferred mode of operation of the masonry constructing apparatus of FIG. 6;

FIG. 13 is a schematic block diagram of a preferred hydraulic system which may be used to operate the components of the FIG. 6 apparatus;

Introduction

Figure 1:
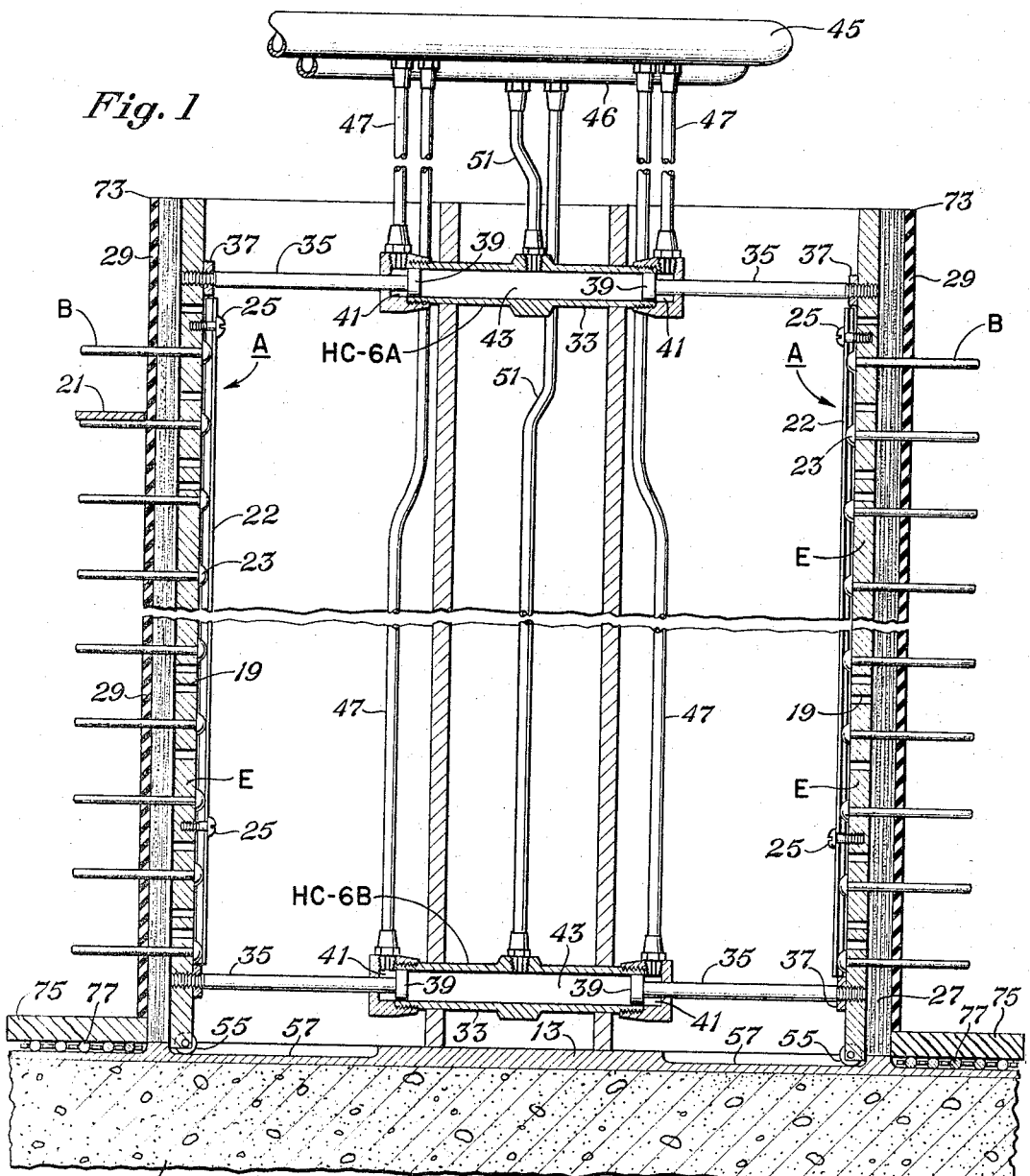

From the drawings it may be seen that I have included for purposes of description the following three distinct embodiments of my masonry constructing apparatus: (1) the apparatus illustrated in FIGS. 1 through 5; (2) the apparatus illustrated in FIGS. 6 through 13; and (3) the apparatus illustrated in FIGS. 14 through 17. Each of these apparatus have a number of common characteristics, some of which will be discussed broadly at this initial stage in the description to provide a basis for a better understanding of my invention.

Each masonry constructing apparatus, for example, includes a unit positioner A that includes a plurality of horizontally extending protrusions B. A multiplicity of units C (shown as bricks in the drawings) are supported by the protrusions B in predetermined spaced relationship and in the form of a vertical wall.

Once the units are placed in predetermined spaced relationship, a unit holder D, which is of the clamping wall type, is disposed around the units C to securely hold them in the spaced relationship established by the protrusions B of the unit positioner A. The protrusions B are then withdrawn from positioning engagement with the units C; the unit holder D holds the units C in place; and a cementatory bonding substance may then be introduced to the unit holder D to join the units. Since the protrusions B extend through apertures in one of the walls of the unit holder D, means are provided (as will be explained in detail later) to seal the apertures in preparation for receiving the cementatory bonding substance that effects the formation of a completed masonry.

In order to facilitate the use of my apparatus with various size units, a coursing adapter structure E upon which the protrusions B are mounted may be provided. This adapter may have a variety of forms, including the apertured wall form shown in FIG. 1 or the coursing box arrangement shown in FIGS. 7 and 14.

As will be seen later, there are additional similar components in the various apparatus, such as the clamping means that are used to secure the walls of the unit holders together and the various mechanisms used to move and position the various components of the apparatus.

The apparatus of FIGS. 1 through 5

FIGS. 1 through 5 illustrate a form of my invention which may be referred to generally as the "retractable unit positioner" type. The reason this term is used will become apparent during the following description.

To provide overall support for the apparatus, base means 11 are provided. Although in this apparatus the base means 11 is shown as being concrete, it should be understood that the base means can have a wide variety of forms and that the invention is not limited to any particular type of base means. It should be apparent that some or all of the components of the apparatus may be even supported from above and if so, the structure above the apparatus that is used for such support will be encompassed by the term "base means."

The base means of FIGS. 1 through 5 has a platform 13 which supports a plurality of vertically extending support structures 15. A coursing adapter structure E, which is a part of a unit positioner A, is provided on each side of the vertical structure 15. The purpose of having two identical and oppositely facing unit positioners A as shown in FIG. 1 is to enable the construction of two masonries simultaneously. This is not essential since only one masonry need be constructed at one time, and if so, generally only one half of the apparatus shown in FIG. 1 is required.

Through a series of apertures 19 in a coursing adapter structure or wall E are inserted horizontally extending protrusions B to support units C of a substantially uniform thickness, such as bricks of a selected size. The protrusions B are spaced in horizontal rows as is apparent in FIG. 1–A. It may be noticed with reference to FIG. 1–A that protrusions B are sparsely distributed over the face of the adapter structure E and that strips of relatively inflexible material 21 are laid over the protrusions. The protrusions B are positioned and the strips 21 sized so that a selected vertical distance separates each horizontal row of units C.

Moreover, the protrusions have a horizontal placement such that each adjoining pair is separated by a distance X (see FIG. 1–A), which is equal to the length of three units C plus the spaces separating them. As a consequence the units may be conveniently spaced horizontally by placing two units C such that their oppositely facing end portions touch protrusions B; the third unit is then spaced inside the two previously placed units, being preferably equidistant from each. If used in this manner, the coursing adapter structure of FIG. 1–A may be used to position the units C in a predetermined spaced relationship, both in the horizontal and vertical directions.

It should be noticed that the protrusions B of adjacent horizontal rows are staggered so that the ends of the units of adjacent horizontal rows are separated by a distance that equals one half the length of each brick. By following the procedure above, as to the alignment of the units with respect to protrusions, the units of each row will be staggered in a manner commonly seen when masonries are constructed by hand.

The coursing adapter structure or wall E has many more apertures than are being utilized in FIG. 1. The concept underlying such a structure is to enable the use of various sizes of units C (consequently various thicknesses) in each apparatus. By arranging the protrusions B (as will be explained below) in different sets of apertures 19, the unit positioner A can conveniently handle units of a different size.

In FIG. 1–C it may be seen that the various aperture locations are associated with one or more code numbers which vary from 2 through 6. Units such as bricks have standard nominal thicknesses and each code number relates with units having one of the standard thicknesses. If the protrusions B are inserted in the apertures 19 associated with one of the selected code numbers, then the protrusions will be spaced vertically the correct distance to receive units of a coded thickness. For example, consider hypothetically that the code number 6 is associated with bricks having a nominal thickness of two inches. If protrusions B are inserted in each aperture bearing the code numeral 6 in FIG. 1–C, then the protrusion will each be separated vertically by a distance equal to the desired course spacing, that is, nominally two inches plus mortar thickness. Each code number is associated with a different nominal thickness of brick and the protrusions B are inserted in the selected coded apertures. Therefore, the coursing adapter structure E provides flexibility to the apparatus by allowing the accommodation of different size units.

To retain the protrusions B in coursing adapter structure E, a length of material 22 is layed over the head portions 23 of each protrusion B and secured thereto by the cooperation of fasteners 25 with the coursing adapter structure E. Any suitable means may be used, however, to retain the protrusions B in the coursing adapter structure E.

A stationary wall 27 is supported by platform 13 and has a plurality of apertures through which the protrusions B are adapted to extend. A sheet of resilient material such as foam rubber 29 is attached to the stationary wall 27 and has a multiplicity of apertures which are aligned with the apertures of the stationary wall 27 and through which the protrusions B extend.

The stationary wall 27 is illustrated as having only the apertures through which protrusions B are inserted. If the positions of the protrusions B are changed within the coursing adapter structure E to accommodate different size units C, then the protrusions will no longer be aligned with the apertures of stationary wall 27. Consequently, it is necessary to change stationary wall 27 each time the protrusions B are relocated in coursing adapter structure E so that the apertures and protrusions are aligned. An alternative is to have all the apertures in the stationary wall 27 aligned with all the apertures of the coursing adapter E, with the ones not containing protrusions B being sealed or plugged.

Means are provided for retracting the unit positioner A with respect to stationary wall 27 so that the protrusions B are no longer in supporting relationship with the units C. The means for providing the retracting motion in the apparatus illustrated in FIGS. 1 through 5, comprises a plurality of hydraulic cylinders HC–6A and HC–6B (see FIG. 1). These cylinders are attached to the vertical support structures 15, and the housing 33 of each cylinder is rigid within the apparatus. The extensible and retractable shafts 35 extend horizontally and may be attached to the coursing adapter structure E as shown at 37 by any suitable means.

Figure 5:
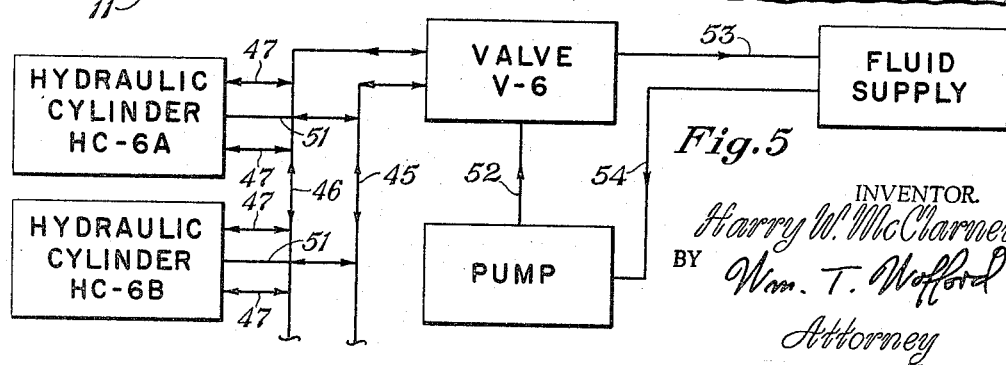
FIG. 5 is a schematic block diagram of a preferred hydraulic system that may be used in connection with the apparatus of FIGS. 1 through 4.

Inside each cylinder 33 and attached to each shaft 35 are two pistons 39, which form two chambers 41 and a chamber 43 within each cylinder. Fluid is introduced under pressure through conduit 45 or conduit 46 (shown above the apparatus of FIG. 1) and may be introduced to chambers 41 of hydraulic cylinders HC–6A and HC–6B through conduits 47 or to chambers 43 through conduits 51. The remainder of a suitable hydraulic system is shown in the schematic block diagram of FIG. 5, where the overhead conduits 45 and 46 of FIG. 1 are shown as being in communication with the hydraulic cylinders HC–6A and HC–6B by means of conduits 47 and 51 as described above. Conduits 45 and 46 communicate with a valve V–6, which is of a type that directs fluid to either conduits 45 or 46. Valve V–6 is supplied with fluid from a pump through conduit 52 and discharges fluid to a fluid supply by means of conduit 53 as shown in FIG. 5. The circuit is completed by connecting the pump with the fluid supply by conduit 54.

To facilitate the retraction of the unit positioner A so that the protrusions B are no longer in positioning relationship with the units or bricks C, the unit positioner A is provided with a plurality of rollers or wheels 55, which are adapted to move in a channel 57 that is formed in the platform 13. This is merely a means to increase the efficiency by decreasing frictional losses in the apparatus but is entirely optional since the device will function without this arrangement.

The unit holder D includes stationary wall 27 and an outer moveable wall 59, which are urged together by clamping units 61 (see especially FIG. 1–B). The clamping units may be of any suitable form, but as shown in FIG. 1–B have two beams 62 that extend horizontally across the exterior faces of walls 27, 59. A fastener shaft 63 extends across each of the end portions of beams 62, with one end being anchored to one of the beams and with the other end extending through an aperture (not shown) in the other beam. A winged nut 65 engages the threaded end 67 of shaft 63.

As may be seen in FIG. 1–B, one of the end walls 69 of unit holder D is hinged at 71 to stationary wall 27. A clamping device 73 is adapted to secure the end wall 69 to moveable wall 59. The purpose of the hinged end wall 69 is to enable the movement of the strips of relatively inflexible material 21 from between the horizontal rows of units C after they have been clamped by unit holder D. End wall 69 is closed and clamped before introducing the cementatory bonding substance.

It is preferable that a resilient material such as foam rubber 73 is used to line the inner face of each wall of the unit holder D to help support the units C.

It is expedient to be able to move a completed masonry from the apparatus in a convenient manner. This is effected by providing a horizontally extending bottom surface 75 that abuts walls 27 and 59 of each unit holder D. Under surface 75 are a plurality of rollers 77 that are preferably caged (like those of FIG. 8) and are retained in a grooved portion of platform B. Thus, when a masonry is completed, it may be retracted by hand, since the roller mounting makes the masonry easy to move.

Operation of the FIGS. 1 through 5 apparatus

Upon the proper orientation of valve V–6, fluid under pressure fills the chambers 43 (see FIG. 1) of hydraulic cylinders HC–6A and HC–6B while the fluid in chambers 41 is discharged. Thus, pistons 39 are driven outwardly so that the shafts 35 force unit positioners A to their maximum outward position as shown in FIG. 2. The protrusions B are extended through the respective apertures in walls 27, 59 and consequently, the protrusions B are positioned to receive the units or bricks C.

As shown in FIG. 1–A, each horizontally aligned row of protrusions B supports a strip 21 which is formed of a relatively inflexible material, for example, mild steel.

The units or bricks C are placed in rows upon the horizontal strips 21, having a spaced relationship and forming a vertical wall. The spacing on each side of each brick is preferably uniform, being formed by using the aid of properly spaced protrusions B as shown in FIG. 1–A.

After the units or bricks C have filled each available space in the various horizontal rows, outer moveable wall 59 is moved into engagement with the units C. Then the outer wall 59 and the inner stationary wall 27 are urged together by the clamping units 61 (see FIG. 2). As may be seen clearly in FIGS. 2 through 4, the resilient lining 67 is attached to the inner side of each wall 59, 27 and this material is beneficial as a means to help support the units C.

Then the shafts 35 of the hydraulic cylinders HC–6A and HC–6B are retracted so that unit positioners A are withdrawn from positioning engagement with the units C, as is shown in FIG. 3. At this stage, the relatively inflexible strips 21 are removed from the spaces between each horizontal row of units since their function has been served, and end wall 69 is clamped shut.

The FIG. 4 illustration shows a preferred arrangement of the apparatus immediately prior to the introduction of a cementatory bonding material between the spaces that separate the units C. It should be noted that the protrusions B, though not in positioning engagement with the units C, have their end portions in engagement with the stationary wall 27, since it is essential to seal or plug the apertures in stationary wall 27 before introducing the cementatory bonding substance. The relationship between the protrusions B, stationary wall 27 and resilient material 73 forms a plugging means for the apertures within the stationary wall.

Although not illustrated in the drawings, the next step is to introduce the cementatory bonding substance between the walls 59 and 27. It is preferable to use a bonding substance having a low viscosity so that if introduced at the upper and open portions of the walls, the substance will run freely between and fill the spaces separating the units C. A substance having the ability to dry quickly should be used so that the walls 59 and 27 may be separated rather quickly in preparation for another sequence like the one described.

The apparatus of FIGS. 6 through 13

The apparatus of FIGS. 6 through 13 is of the "retractable unit positioner" type, as was the apparatus of FIGS. 1 through 5. One of the differences between these apparatus stems from the different approach used in providing a coursing adapter structure E, which it will be remembered, is the device that enables the use of the apparatus with units of a different thickness. Whereas the apparatus illustrated in FIGS. 1 through 6 has a coursing adapter structure in the form of a wall, with a number of apertures through which the protrusions B extend, the FIGS. 6 through 13 apparatus has a coursing adapter structure that is in the form of a coursing box, which is perhaps most clearly shown in the fragmentary perspective view of FIG. 7. The various differences between the two apparatus which derive from the use of the different types of coursing adapter structures E will become apparent hereinafter.

Figure 9:
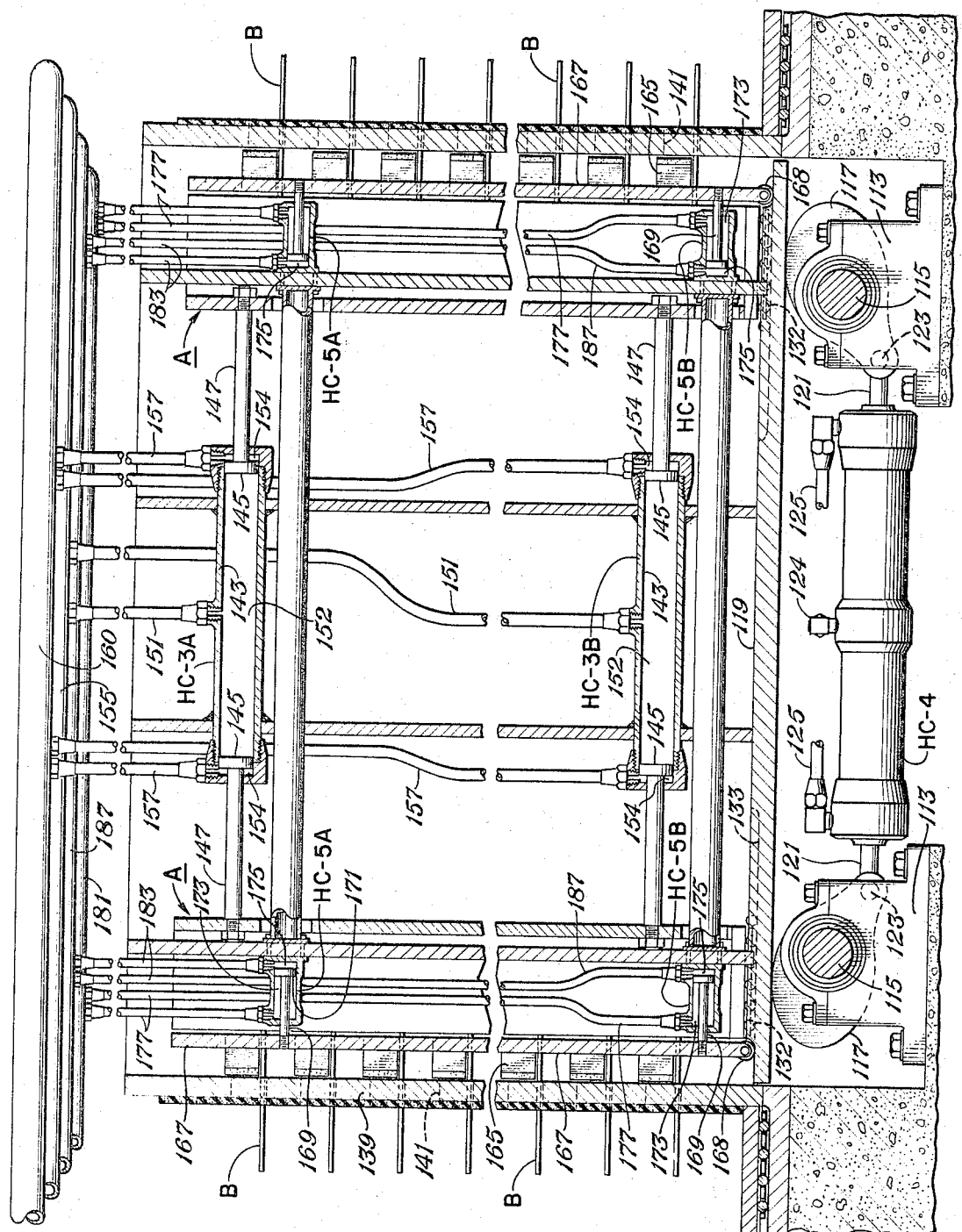
FIG. 9 is a side elevational and sectional view that illustrates in greater detail the various components found within the masonry constructing apparatus of FIG. 6.

Referring initially to FIG. 9, a base means 111 (which in this instance is the concrete beneath the apparatus but which could be steel beams or any other suitable supporting arrangement) upholds shaft supports 113, which in turn support the shafts 115 and the attached cams 117. The cams engage and support a platform 119 and are actuated by means of one or more hydraulic cylinders HC–4, each of which has shafts 121 that pivotally engage a portion of cams 117, as shown at 123. The purpose of this arrangement is to provide means for controlling the elevation of the unit positioners A and the plugging means, both of which will be described hereinafter.

The shafts 121 of each hydraulic cylinder HC–4 (there may be two or more as shown in FIG. 13 and designated HC–4A, HC–4B) may be extended by directing fluid by means of valve V–4 through central conduit 124, while allowing fluid to exit the cylinder through conduits 125. As may be seen in FIG. 13, conduits 124 and 125 communicate with valve V–4 respectively by means of conduits 126 and 128. The shafts 121 of each cylinder may be retracted by forcing fluid through conduits 128 and 125 while allowing fluid to exit the cylinder through conduits 124 and 126. Valve V–4 communicates with a pump through conduits 127 and 129, and discharges fluid to a fluid supply through conduits 130 and 131.

Near each side edge of platform 119 (as viewed in FIG. 9) are mounted a row of unit positioners A. As in the FIGS. 1 through 5 apparatus, each unit positioner A has a plurality of protrusions B, the function of which is to position units or bricks C in a predetermined spaced relationship and in the form of a vertical wall.

Figure 7:
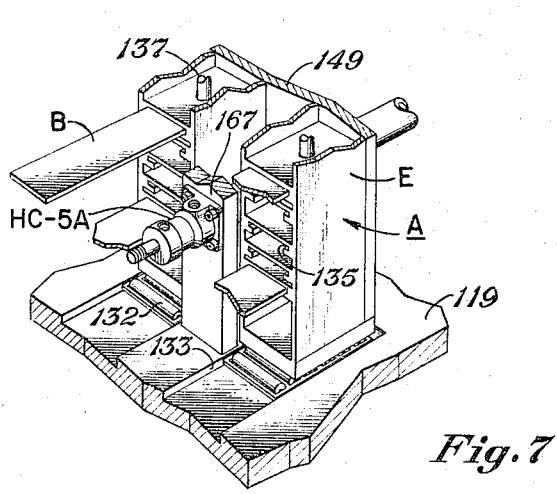
FIG. 7 illustrates a fragmentary perspective view of a coursing adapter structure which is included in the FIG. 6 apparatus so that units of a different thickness may be used in the apparatus.
Figure 8:
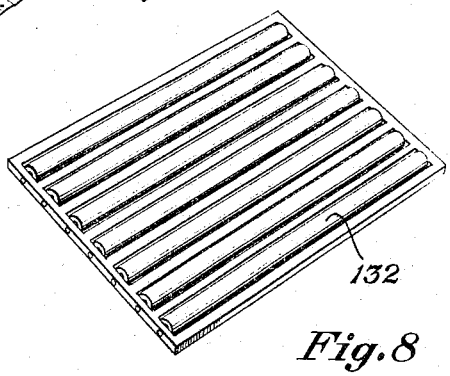
FIG. 8 is a perspective view showing a roller device upon which the coursing adapter structure of FIG. 7 is mounted so that the unit positioner may be retracted with reduced frictional losses.

So that units of different thicknesses may be used in the apparatus, a coursing adapter structure E (see especially FIG. 7) is provided. This structure is in the form of a box which is supported on rollers 132 (preferably caged, as shown in FIG. 8) to facilitate horizontal movement of the structure with respect to platform 119. Each coursing adapter structure or box E (there are a number of coursing boxes in each apparatus as is clearly indicated in FIGS. 6 and 7) includes a plurality of slots 135 into which are inserted the protrusions B. The slots 135 have different spacings (like the adapter structure of FIGS. 1 through 5) so that units or bricks C of different thicknesses may be used in the apparatus. To retain the protrusions B in slots 135, a rod 137 extends downwardly through a vertically aligned row of apertures in each coursing box E and each protrusion B. Thus, to move the protrusions B to different apertures the rod 137 is removed; the protrusions B are withdrawn and then reinserted in the desired slot 135; and then the rod 137 is replaced.

Figure 6:
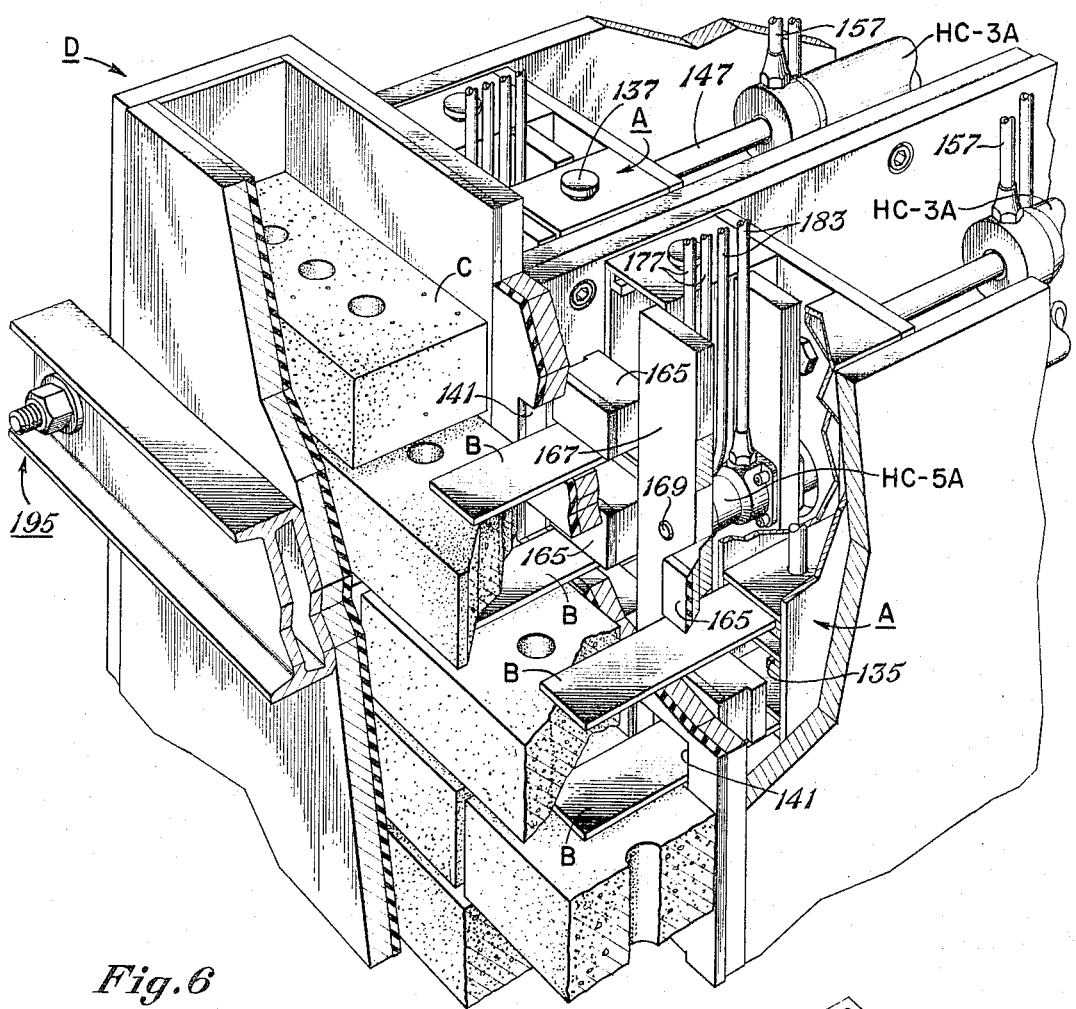
FIG. 6 is a fragmentary perspective view which illustrates an alternate form of my masonry constructing apparatus. The units in this illustration are bricks which are illustrated as being in positioning engagement with a plurality of horizontally extending protrusions, and in engagement with the clamping walls of the unit holder.

Since the protrusions B can be moved to different elevations in the coursing boxes E, the stationary wall 139 of each unit holder D has apertures 141 that are elongated in the vertical direction. As shown in FIG. 6 the apertures 141 are also elongated in the horizontal direction since the protrusions B are rectangular in cross section. The protrusions need not be rectangular, however, but may be circular in cross section and if so, the aperture 141 would not have the rectangular form seen in FIG. 6.

In the FIGS. 1 through 5 apparatus the apertures of stationary wall 27, through which protrusions B extend, engage the protrusions B and are sealed by means of the cooperative action of resilient material 29 with the protrusions. When it is desired to use units of a different size, the protrusions B are inserted in different apertures 19 and a new stationary wall 27, having apertures that match the new position of protrusions B, is provided.

In the present apparatus, however, the approach to the sealing or plugging problem is different. Here, the concept is to provide a wall 139 having vertically elongated slots 141 through which the protrusions B extend irrespective of their position in the coursing adapter structure E. The means used to plug the apertures 141 will be described later.

Means for retracting each unit positioner A with respect to unit holders D are provided. In this apparatus the means comprises a plurality of hydraulic cylinders, such as HC–3A and HC–3B. It should be noted that as illustrated in FIG. 9 the apparatus is capable of forming two composite masonry walls simultaneously but that the apparatus may be modified to construct only one masonry wall at a time. As is apparent from FIG. 9, the components on each side of the apparatus are identical. Cylinders HC–3A and HC–3B have housings 143 in which are mounted pistons 145. Shaft 147 of the cylinders are connected by suitable means to beams 149 that form the rear of the coursing boxes E, as may be seen in FIG. 7.

To extend shafts 147 and the attached coursing boxes E to the position shown in FIG. 9, fluid is directed by means of a valve V–3 (see FIG. 13) into central chambers 152 (see FIG. 9) inside the housing 143 of the cylinders through conduits 151, each of said conduits being in communication with a conduit 155 that extends above the apparatus and is attached to valve V–4 as seen in FIG. 9. Simultaneously, fluid is withdrawn from the end chambers 154 inside housing 143 through conduits 157, each of which communicates with a conduit 160 attached to valve V–3.

To retract shafts 147 and the coursing boxes E, fluid is directed by valve V–3 into chambers 154 of hydraulic cylinders HC–3A and HC–3B, while being withdrawn from chambers 152. Valve V–3 communicates with a pump by means of conduits 161 and 129 and returns fluid to a fluid supply through conduits 162 and 131.

As will become apparent in the operational description, after the retraction of the protrusions B to a position exterior of stationary wall 139, it is necessary to plug the apertures 141 of wall 139. To effect this result, it is necessary that plugs 165 be moved to an elevation such that they are properly aligned with the apertures 141. The movement of the plugs 165 is accomplished by mounting them to a vertically extending beam 167 that has wheels or rollers 168 at the lower edge thereof and is attached to the coursing box E and thus supported on the platform 119. Consequently, as the platform 119 is raised or lowered by the cooperative engagement with the cams 117, the plugs 165 are also raised or lowered.

In addition to the required change in elevation of the plugs 165, they must be extended outwardly after they are properly aligned with the apertures 141 so that each wall 139 is effectively sealed in preparation for receiving the cementatory bonding substance. The required extension is effected by attaching the beam 167 upon which the plugs 165 are mounted to a plurality of shafts 169, which form the extremities of a plurality of hydraulic cylinders HC–5A and HC–5B as may be seen in FIG. 9. A piston 171 (see FIG. 9) within each hydraulic cylinder HC–5A and HC–5B divides each cylinder into two chambers 173, 175.

To position pistons 171 of cylinders HC–5A and HC–5B in the retracted position shown in FIG. 9, fluid is introduced under pressure into chambers 173 of the cylinders through conduits 177, each of which communicates with the conduit 181 that is connected to a valve V–5 as seen in FIG. 13. At the same time, fluid is withdrawn from the chambers 173 of the hydraulic cylinders HC–5A and HC–5B through the conduits 183, both of which communicate with a conduit 187 that in turn is connected with a valve V–5, as is seen in FIG. 13. The valve V–5 is connected by conduit 129 to a pump, and has a discharge conduit 189 that returns the fluid to a fluid supply, as shown. The hydraulic circuit is closed by connecting a fluid supply to the pump by means of a conduit 191. It should be noticed that the arrangement of the hydraulic cylinders HC–5A and HC–5B and their conduit arrangements are identical on both sides of the apparatus as seen in FIG. 9.

Referring now to FIGS. 10 through 12, the unit holder D includes an outer wall 193 that is urged into engagement with a plurality of units or bricks C by means of a clamp device 195, which in this instance may be identical with the clamping device described in connection with the apparatus of FIGS. 1 through 5. Also, sheets of resilient material 197 are provided on each of the walls 193 and 139 to help secure the units C between the walls and to form the cementatory bonding substance in the desired shape at the juncture of each unit. In addition, rollers 199 (like the rollers 131 of FIG. 8) are provided to separate a laterally extending surface 201 of wall 139 from a grooved piece of metal or other wear resistant material 203 which is supported by the base means 111. This enables easy movement of the unit holder. It should be remembered that even though the unit holder D is moveable, it is nevertheless occasionally referred to as being the "stationary member" in this apparatus since it is actually the unit positioner A that functions in operation as a retractable device that separates the protrusions B from positioning engagement with the units or brick C.

Operation of the FIGS. 6 through 13 apparatus

The operation of this apparatus may be better understood by referring to FIGS. 10 through 12. In FIG. 10 it may be seen that the units or brick C have been placed on the protrusions B of the unit positioners A and that walls 193 and 139 have been urged together by the clamping means 195. It should be noted that cams 117 upon which the platform 119 is supported are positioned by the actuation of hydraulic cylinders HC-4 so that the protrusions B of the unit positioner A are maintained at a proper vertical relationship with respect to the unit holder D.

Next, the protrusions B of the unit positioner A are withdrawn from positioning engagement with the units C by the action of hydraulic cylinder HC-3A and HC-3B. This is accomplished by orienting the valve V-3 (see FIG. 13) such that fluid is introduced under pressure into the cylinders through conduits 157 and 155 while simultaneously discharging fluid from the cylinders through conduits 151 and 160. By this means, the protrusions B are withdrawn to a position exterior of the wall 139, as may be seen in FIG. 11.

At this stage, the plugs 165 are not in the proper vertical alignment with the apertures 141 of wall 139 and should be lowered. This is accomplished by driving the shafts 121 of hydraulic cylinders HC-4A and HC-4B by orienting valve V-4 (see FIG. 13) so that shafts 121 are retracted to permit cams 117 to lower the platform 119.

To plug the apertures 141, the valve V-5 (see FIG. 13) is actuated so that the fluid enters cylinders HC-5A and HC-5B through conduits 183 and 187, while leaving the cylinders HC-5A and HC-5B through condiuts 177 and 181. Consequently, the shafts 169 are extended and the plugs 165 seal the apertures 141.

At this stage, the cementatory bonding substance may be introduced between the walls 193 and 139 and allowed to fill the spaces that separate the units C. After the substance has dried for a suitable period, the clamping means 195 are opened, walls 139 and 193 separated and the completed masonry is removed.

The apparatus of FIGS. 14 through 17

I refer to this apparatus as the "retractable unit holder" type, since unit holders D retract with respect to stationary unit positioners A. The two previously described apparatus were the "retractable unit positioner" types as was explained previously. In this the instant apparatus a specific base means 311 is illustrated in the accompanying drawings but again, it should be understood that any suitable base means may be used. Upon base means 311 are two spaced apart steel plates 313 which support the retractable unit holders D. The dual arrangement enables the construction of two masonries simultaneously, but only one half the apparatus may be used if desired and it should be apparent that the unit holders D and their attached components are identical.

To facilitate the movement of the retractable unit holders D, the plates 313 have grooves 315 into which are inserted the caged rollers 317 that engage a lateral plate 320 located on the bottom of unit holder D. The use of the rollers 317 is not essential, but reduces friction and the amount of power needed to retract the unit holders D.

Unit holders D are of the clamping wall type (quite similar to those previously described), each having an outer wall 319 and an inner wall 321. Inner wall 321 has laterally extending portions 322 that engage outer wall 319. As in the previously described apparatus, the walls are preferably lined with a resilient material 324. The purpose of these walls is to clamp the units C (shown in the drawings as bricks) in the predetermined spaced relationship established by the protrusions B of the unit positioner A. The clamping means includes fastener devices 323, which span the two walls and are similar to those previously described.

Figures 16, 17:
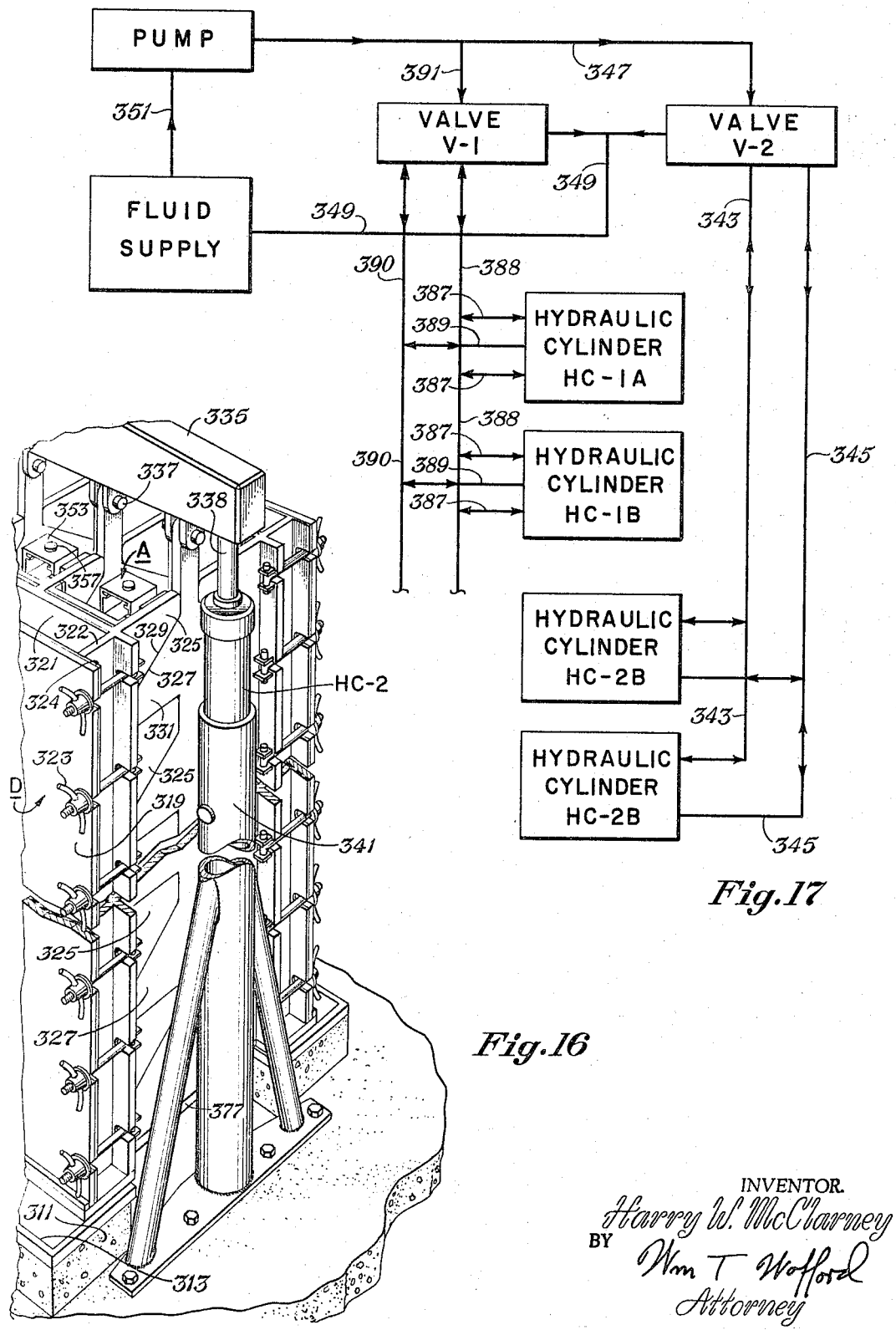
FIG. 16 is a fragmentary perspective view showing an end portion of the apparatus of FIG. 14.
FIG. 17 is a schematic block diagram which illustrates a preferred hydraulic system which may be used to control the various components of the FIG. 14 masonry constructing apparatus.

Inner wall 321 has a plurality of rows of integral plates 325, each row of which is aligned in a vertical plane as may be seen in FIG. 16. Each of the plates 325 has at least one upwardly and inwardly (i.e., toward the interior of the apparatus) extending cam surface 327 that engages a mating cam surface 329, which is a part of a plate 331, as is apparent in FIGS. 14 through 16. There are a plurality of plates 331, which are aligned in vertical rows for engagement with the plates 325 above. The uppermost plate of each row has an upwardly extending projection 333 which is attached to a cross bar 335 by means of pins 337. The shafts 338 of hydraulic cylinders HC-2A and HC-2B are connected to an under surface of cross bar 335, and each cylinder is mounted in a suitable pedestal 341 that is supported by the base means 311 (see FIG. 16).

It is the function of the plates 325 and 331 to help retract the unit holders D with respect to each unit positioner A so that the protrusions B may be removed from positioning relationship with the units or bricks C and moved to a position exterior of the wall 321. Referring now to FIG. 17, it may be seen that hydraulic cylinders HC-2A and HC-2B are connected to a valve V-2 by conduits 343 and 345. Conduits 343 are connected to chambers (not shown) within the cylinders so that the introduction of fluid under pressure retracts the shafts 338 and pulls the cross bar 335 downwardly. Conduits 345 are connected to other chambers (not shown) within the cylinders so that fluid may be evacuated from those chambers.

When it is desired to move the cross bar 335 upwardly to retract the unit holders D from engagement with the protrusions B of the unit positioner A, the valve V-2 is oriented so that fluid under pressure is introduced into the chambers associated with conduits 345 and so that the fluid in the chambers associated with conduits 343 is withdrawn from the cylinders. Thus, the valve V-2 controls the flow of fluid into hydraulic cylinders HC-2A and HC-2B so that shafts 337 are extended and push cross bar 335 and the attached plates 331 upwardly. The camming action of the engaging surfaces 327 and 329 of plates 325 and 331 forces the unit holders D outwardly.

Valve V-2 is connected to a pump by means of conduit 347 and discharges fluid into a conduit 349 that communicates with a fluid supply, all of which may be seen in FIG. 17. To complete the hydraulic circuit, a conduit 351 connects the fluid supply with the pump.

As in the apparatus of FIGS. 6 through 13, the protrusions B of the unit positioner A are rectangular in cross section and are mounted to coursing adapter structures 353. The purpose of the coursing adapter structure 353 is to enable the accommodation of units or bricks C of different thicknesses. These structures are identical with the one illustrated in FIG. 7 each of them having a plurality of vertically spaced slots 355. The distance separating each pair of adjoining protrusions B may be adjusted by placing the protrusions B in selected slots 355, in the manner described in connection with FIGS. 1 through 6. So that the protrusions B may be moved to different slots 355 in a convenient manner, a removable rod 357 extends through a central aperture in each coursing adapter structure (in this instance coursing boxes). Each protrusion B has an aperture through which the rod 357 is inserted so that each protrusion is securely retained in the coursing box 353.

Figure 14:
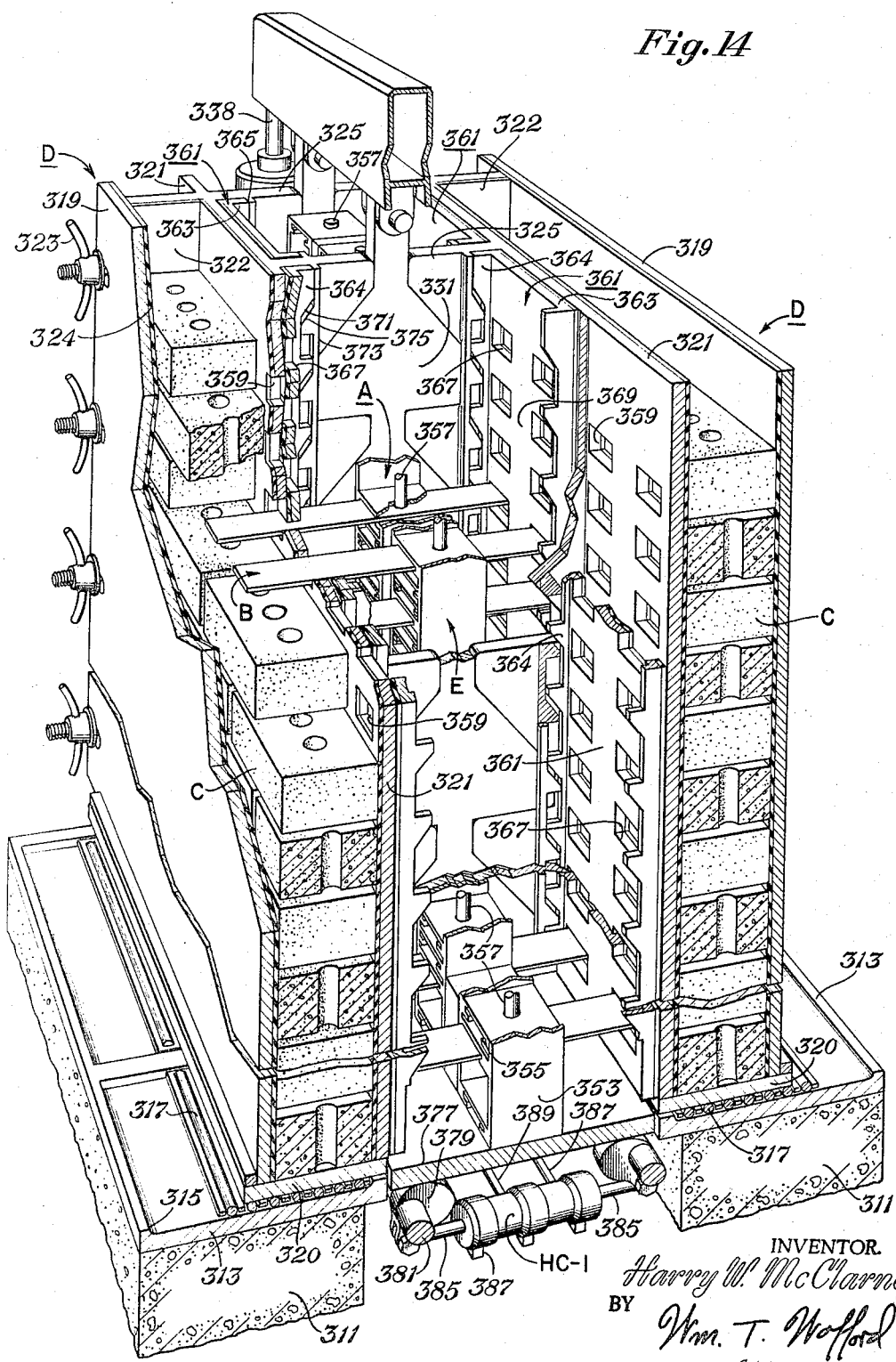
FIG. 14 is a perspective view of an alternate form of my masonry constructing apparatus, with portions thereof broken away to clarify details of the construction.

Since the protrusions B can be placed in different slots 355 and thus may have different elevations, the inner wall 321 has vertically elongated apertures 359 that may be best seen in FIG. 14. Before the introduction of the cementatory bonding substance, the apertures 359 must be sealed or plugged to retain the substance within the spaces that separate the units or bricks C.

The means used to plug the apertures 359 includes a vertically shiftable wall 361 having end portions 363 that are formed to match recesses 365 between the inner wall 321 of the unit holder D and each plate 325 that extends therefrom (see especially FIG. 14). Thus, the vertically shiftable walls 361 are positioned and retained in the apparatus so that they slidably engage the inner wall 321 of unit holder D.

Figure 15:
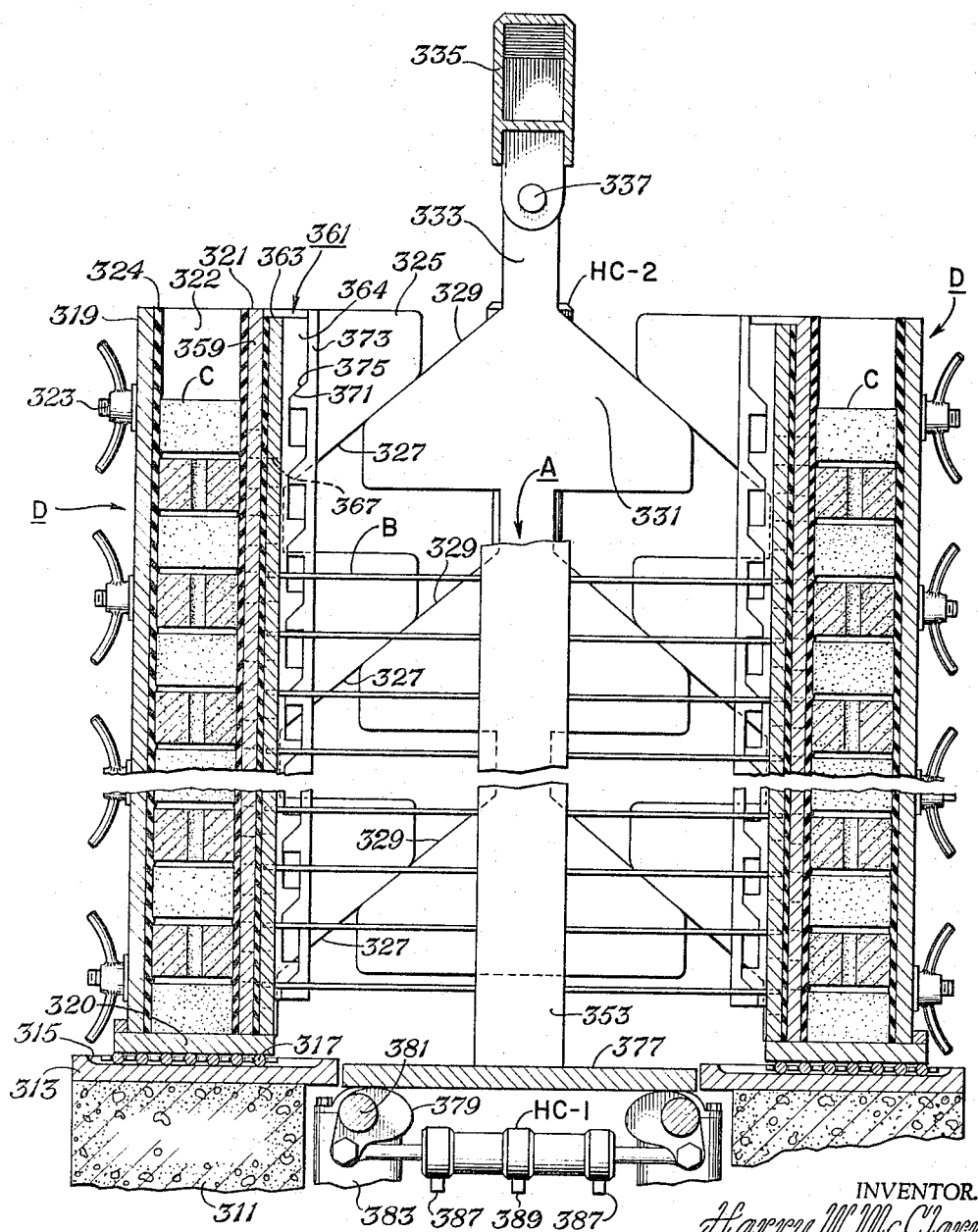
FIG. 15 is a fragmentary and sectional side elevational view which shows the apparatus of FIG. 14 in another operational position.

When the unit holders D are retracted a large distance, the protrusions B are withdrawn from wall 321 and also from wall 361 of the plugging means. In this event, the wall 361 of the plugging means will fall due to its weight to the position shown in FIG. 15. (Notice in FIG. 14 that the vertically shiftable wall 361 is flush at its upper end with the walls 321 of the unit holders D, but that in FIG. 15 wall 361 upper surface is below the walls of the unit holders.) The vertically shiftable wall 361 contains rectangular apertures 367 that are positioned to be aligned with the apertures 359 of the inner wall 321 of unit holder D so that the protrusions B may extend therethrough as shown in FIG. 14. When the vertically shiftable wall 361 is lowered as shown in FIG. 15, however, the solid portions 369 between each aperture 367 of the wall 361 covers the apertures 359 of the inner wall 321 of unit holder D. To insure that an effective seal is formed between the walls 361 and 321, means are provided for urging the vertically shiftable wall 361 laterally against the wall 321.

The means for urging the vertically shiftable wall 361 against wall 321 are illustrated here as being camming surfaces that cooperate with the gravitional forces exerted on the vertically shiftable wall 361. With reference to FIGS. 14 and 15 it may be seen that the protrusions 364 on each wall 361 have cam surfaces 371 that extend outwardly and downwardly. Secured to the plates 325 of each unit holder D is a strip of material 373 that has downwardly and outwardly extending cam surfaces 375 that mate with the camming surfaces 371 of the protrusions 363 of wall 361. The effect of the mating engagement of the surfaces 371 and 375 is to urge the wall 361 laterally outwardly when the wall 361 is urged downward by the force of gravity.

Means are provided for adjusting the vertical position of the protrusions B of the unit positioners A, and these same means may be used to lift the vertically shiftable wall 361 after the cementatory bonding substance that is introduced between the walls 319 and 321 of the unit holders D has set.

Referring especially now to FIG. 15, it may be seen that the coursing adapter structures 353 are mounted to a platform 377 which is movable in a vertical direction relative to the spaced apart platform 313 that are mounted to the base means 311. Platform 377 is supported by cams 379, which in turn are mounted on shafts 381 of support structure 383 (see FIG. 15). Although not illustrated in the drawings, the support structure 383 is attached to the base means 311. One or more hydraulic cylinder HC–1 have shafts 385 that are pivotally connected to the cams 379. The retraction of shafts 385 rotates the cams 379 to a position such that platform 377 is elevated. The extension of shafts 385 moves the cams 379 to a position such that the platform 377 is lowered.

The cylinders HC–1A and HC–1B have two conduits 387 (see especially FIG. 17) on their end portions which communicate with valve V–1 by means of conduit 388 and with chambers (not shown) within cylinders HC–1A and HC–1B. A third conduit 389 joined to valve V–1 by conduit 390, communicates with another chamber (not shown) within each cylinder. Valve V–1 may be adjusted so that fluid under pressure enters the cylinders through conduits 390 and 389, while leaving the cylinders through conduits 387 and 388 to extend shafts 385. Conversely, valve V–1 may be adjusted so that fluid under pressure enters the cylinders through conduits 387 and 388 while leaving the cylinders through conduits 389 and 390 to retract the shafts 385.

Thus, it should be apparent that by proper orientation of the valve V–1, the shafts 385 of the cylinder HC–1 may be extended or retracted in a convenient manner so that the platform 377 may be raised or lowered. As may be seen in FIG. 17, the valve V–1 is connected to a pump by conduits 391 and 347 and discharges fluid into conduit 349 that communicates with the fluid supply.

*Operational description of the FIGS. 14 through 17 apparatus*

The inner and outer walls 319, 321 of unit holders D are initially separated so that wall 319 may be moved in preparation for loading the apparatus with units or bricks C. The inner wall 321 of each unit holder D is moved inwardly (by hand since it is very light when empty) toward unit positioner A until the protrusions B extend through apertures 367 of wall 361 and through apertures 359 of wall 321. Before the protrusions B can extend through the apertures 367 and 359, the hydraulic cylinders HC–1 must be actuated by properly orienting valve V–1 so that the cooperation of cams 379 and platform 377 elevate or lower the protrusions B to the required heights. Also, the vertically shiftable wall 361 must be moved into a relationship with wall 321 such that the apertures 359 and 367 are aligned sufficiently to permit protrusions B to be inserted therein. Preferably, protrusions B always engage the apertures 367 of the vertically shiftable wall 361 (even upon retraction of unit holder D as seen in FIG. 15) so that vertical movement of protrusions B by hydraulic cylinders HC–1 also moves the wall 361.

Unit holder D is moved on rollers 317 with very little effort and for this reason the unit holder D may be moved back and forth manually. It would be within the scope of the invention to provide automatic means for the movement of the unit holder D and this would be expedient if the unit holders were large or heavy.

With the protrusions B positioned as shown in FIG. 14, the units or bricks C are placed on the protrusions B and occupy a spaced apart relationship and are in the form of a vertical wall. It should be noted that in the FIG. 14 illustration that there are preferably two protrusions B for each unit C so that the units are supported in a stable fashion.

After the units C have been positioned on the protrusions B and have horizontal as well as vertical spaced relationship, the outer wall 319 is moved into engagement with the units C and walls 319, 321 are clamped by device 323 to retain the units C in the position established by the unit positioners A. At this stage, the protrusions B may be withdrawn from positioning engagement with units C, and this is accomplished by first lowering the protrusions B slightly by orienting valve V–1 so that fluid under pressure flows into the hydraulic cylinders HC–1 through conduits 388, 387 and out of the hydraulic cylinders HC–1 through conduits 389, 390. This will extend the shafts 385 of the hydraulic cylinders and move the cams 389 to the position shown in FIG. 15. By slightly lowering the protrusions B, they may be easily withdrawn from engagement with the units C since there will be no friction between the moving components.

As shown in FIG. 15, the protrusions B have their outer extremities extending partially into the apertures 367 of wall 361. Upon further extension of shafts 387 of hydraulic cylinders HC–1, the protrusions B and the engaged walls 361 may be further lowered to a position such that wall 361 plugs the apertures 359 of wall 321. The weight of wall 361 and the cooperative engagement of cam surfaces 371 and 375 urges the vertically shiftable wall 361 into sealing engagement with wall 321.

A cementatory bonding substance is now introduced between walls 319 and 321 of unit holder D so that all of the spaces between unit C are filled. After enough time has elapsed so that the cementatory bonding substance has set, the clamping device 323 are loosened, outer wall 319 removed, and the masonry that has formed therein is removed.

To prepare for another sequence as described above, valve V–1 is actuated so that the shafts 385 of hydraulic cylinders HC–1 are retracted to move cams 379 in a manner to raise the platform 377 and thus the protrusions B. This will enable protrusions B to be aligned with the apertures 359 of wall 321 so that unit holder D may be moved to a position such that protrusions B extend through the apertures to support units C, as is shown generally in FIG. 14.

It should be apparent from the foregoing that I have provided improved masonry constructing apparatus having significant advantages. My improved means for positioning masonry units in selected spaced relationship enables the provision of apparatus having extensive versatility. The protrusions B may have a number of geometric forms, including the peg form of the apparatus of FIGS. 1 through 5 and those having a form that is rectangular in cross section, as seen in the apparatus of FIGS. 6 through 13 and of FIGS. 14 through 17. It should be apparent that the peg type protrusions of FIGS. 1 through 5 may be used with the various apparatus of FIGS. 6 through 17. Similarly, protrusions that are rectangular in cross section, as seen throughout FIGS. 6 through 17, may be used with the apparatus of FIGS. 1 through 5. Also, the unit support means that includes sparsely distributed protrusions and the strip of material 21 (see FIG. 1–A), may be used with all forms of my apparatus. The versatility of my invention enables the utilization of various geometrical shapes and distributions of protrusions in each type of apparatus and is a significant advantage.

It is advantageous to have a masonry constructing apparatus wherein a unit positioner A includes a coursing adapter structure E. By this means, units C of a different nominal thickness may be conveniently accommodated in the various apparatus. The coursing adapter structure selected for use in a particular apparatus may be of the wall type, as shown in FIG. 1, or the coursing box type, as seen in FIG. 7, a feature giving even greater versatility to the invention. The wall type adapter of FIGS. 1 through 6 has the advantage of simplicity, but the coursing box type of FIGS. 6 through 17 can be made up of a plurality of modular coursing box sets. Either of the types of coursing adapters may be utilized with any of my masonry constructing apparatus.

Other advantages of my invention derive from the cooperative arrangements between the unit positioners A and the unit holder D. Once the units are positioned in a selected spaced relationship by the use of a unit positioner A, a unit holder D then secures the units C in that position. The retractability of the unit positioners A (and protrusions B) and unit holders D allows the cementatory bonding substance, when introduced, to completely fill the courses between units. Hence, the cooperative arrangement of unit positioners and unit holders leads to improved masonry as well as effective and efficient manner of operation.

Advantages are derived from the sealing means that cooperate with the unit holder apparatus to prevent the egress of cementatory bonding substance. The effective elimination of egress of cementatory bonding substance from the apparatus is a significant improvement over apparatus which derives from the concept of having coacting unit positioners and unit holders. As described in the detailed description, the sealing or plugging means may have a variety of forms, including the type seen in FIG. 1 where the protrusions B have end portions that act as plugs that cooperate with an inner wall of a unit holder. It is advantageous to utilize the resilient material that may be used to cover the inner surface of the wall of the unit holder as a cooperative means to aid the end of the protrusions B in forming seal or plug means. Such an arrangement is simple and thus economical, and may be utilized with the apparatus of FIGS. 6 through 17 as well as the apparatus of FIGS. 1 through 5. In instances where the wall of the unit holder has vertically elongated apertures (see FIG. 6 and also FIG. 14), either the wall type plugging means of FIG. 14 or the individual type plugging means of FIG. 6 may be used. Such plugging means may be used with apparatus having either retractable unit holders or retractable unit positioners and are thus convenient means to form effective seal or plug means.

While I have shown my invention in several forms, it will be obvious to those skilled in the art that it is not so limited, but is susceptible of various changes and modifications without departing from the spirit thereof.

I claim:
1. An apparatus for constructing masonries that include a plurality of masonry units joined by means of a cementatory bonding substance, said apparatus comprising:
   (a) a base means;
   (b) a unit positioner structure that includes a plurality of horizontally extending protrusions for positioning masonry units in the form of a vertical wall and in predetermined spaced relationship, with said structure being supported by said base means;
   (c) a unit holder adapted to surround said masonry units and being supported by said base means, said unit holder having a plurality of relatively movable walls, one of said walls having apertures through which said protrusions are adapted to extend;
   (d) said unit holder including means engaging said walls to urge them together to clamp said units in said predetermined spaced relationship; and
   (e) said structure and unit holder being retractable with respect to each other to free said protrusions from positioning relationship with said units after said units are clamped.

2. The invention as defined by claim 1 wherein said unit positioner structure includes one or more said prosions for each unit.

3. The invention as defined by claim 1 wherein said protrusions are disposed in horizontal rows and wherein protrusions of each horizontal row engage and support a strip of relatively inflexible material upon which units are laid.

4. The invention as defined by claim 3, wherein said unit positioner includes less than one said protrusion for each unit.

5. The invention as set forth by claim 3, wherein said protrusions are disposed partially within vertically extending joints of said units.

6. An apparatus for constructing masonries that include a plurality of masonry units joined by means of a cementatory bonding substance, said apparatus comprising:
   (a) a base means;
   (b) a unit positioner structure that includes a plurality of horizontally extending protrusions for positioning masonry units in the form of a vertical wall and in predetermined spaced relationship, with said structure being supported by said base means;
   (c) a unit holder adapted to surround said masonry units and being supported by said base means, said unit holder having a plurality of relatively movable walls, one of said walls having apertures through which said protrusions are adapted to extend;
   (d) said unit holder including means engaging said walls to urge them together to clamp said units in said predetermined spaced relationship;
   (e) said structure and unit holder being retractable with respect to each other to free said protrusions from positioning relationship with said units after said units are clamped; and
   (f) means for plugging said apertures preparatory to the introduction of the cementatory bonding substance to the spaces separating said units.

7. The invention as defined by claim 6 wherein said plugging means includes plugs which are end portions of said protrusions.

8. The invention as defined by claim 6 wherein said plugging means includes a portion of resilient material disposed on the inner surface of the wall of said unit holder containing said apertures.

9. An apparatus for constructing masonries that include a plurality of masonry units joined by means of a cementatory bonding substance, said apparatus comprising:
   (a) a base means;
   (b) a unit positioner structure that includes a plurality of horizontally extending protrusions for positioning masonry units in the form of a vertical wall and in predetermined spaced relationship, with said structure being supported by said base means;
   (c) a unit holder adapted to surround said masonry units and being supported by said base means, said unit holder having a plurality of relatively movable walls, one of said walls having apertures through which said protrusions are adapted to extend;
   (d) said unit holder including means engaging said walls to urge them together to clamp said units in said predetermined spaced relationship; and
   (e) means engaging said unit positioner structure to retract this structure with respect to said unit holder to free said protrusions from positioning relationship with said units after said units are clamped by said unit holder.

10. The invention as defined by claim 9, wherein said unit positioner structure includes one or more said protrusion for each unit.

11. The invention as defined by claim 9, wherein said protrusions are disposed in horizontal rows and wherein protrusions of each horizontal row engage and support a strip of relatively inflexible material upon which units are laid.

12. The invention as defined by claim 11, wherein said unit positioner includes less than one said protrusion for each unit.

13. The invention as set forth by claim 11, wherein said protrusions are disposed partially within vertically extending joints of said units.

14. An apparatus for constructing masonries that include a plurality of masonry units joined by means of a cementatory bonding substance, said apparatus comprising:
   (a) a base means;
   (b) a unit positioner structure that includes a plurality of horizontally extending protrusions for positioning masonry units in the form of a vertical wall and in predetermined spaced relationship, with said structure being supported by said base means;
   (c) a unit holder adapted to surround said masonry units and being supported by said base means, said unit holder having a plurality of relatively moveable walls, one of said walls having apertures through which said protrusions are adapted to extend;
   (d) said unit holder including means engaging said walls to urge them together to clamp said units in said predetermined spaced relationship;
   (e) means engaging said unit positioner structure to retract this structure with respect to said unit holder to free said protrusions from positioning relationship with said units after said units are clamped by said unit holder; and
   (f) means for plugging said apertures preparatory to the introduction of the cementatory bonding substance to the spaces separating said units.

15. The invention as defined by claim 14, wherein said plugging means includes plugs which are end portions of said protrusions.

16. The invention as defined in claim 14, wherein said plugging means includes a portion of resilient material disposed on the inner surface of the wall of said unit holder containing said apertures.

17. An apparatus for constructing masonries that include a plurality of masonry units joined by means of a cementatory bonding substance, said apparatus comprising:
   (a) a base means;
   (b) a unit positioner structure that includes a plurality of horizontally extending protrusions for positioning masonry units in the form of a vertical wall and in predetermined spaced relationship, with said structure being supported by said base means;
   (c) a unit holder adapted to surround said masonry units and being supported by said base means, said unit holder having a plurality of relatively moveable walls, one of said walls having apertures through which said protrusions are adapted to extend;
   (d) said unit holder including means engaging said walls to urge them together to clamp said units in said predetermined spaced relationship; and
   (e) means engaging said unit holder for retraction from said unit positioner structure to free said protrusions from positioning relationship with said units.

18. The invention as defined by claim 17, wherein said unit positioner structure includes one or more said protrusions for each unit.

19. The invention as defined by claim 17, wherein said protrusions are disposed in horizontal rows and wherein protrusions of each horizontal row engage and support a strip of relatively inflexible material upon which units are laid.

20. The invention as defined by claim 19, wherein said unit positioner includes less than one said protrusion for each unit.

21. The invention as set forth by claim 19, wherein said protrusions are disposed partially within vertically extending joints of said units.

22. An apparatus for constructing masonries that include a plurality of masonry units joined by means of a cementatory bonding substance, said apparatus comprising:
   (a) a base means;
   (b) a unit positioner structure that includes a plurality of horizontally extending protrusions for positioning masonry units in the form of a vertical wall and in predetermined spaced relationship, with said structure being supported by said base means;
   (c) a unit holder adapted to surround said masonry units and being supported by said base means, said unit holder having a plurality of relatively moveable walls, one of said walls having apertures through which said protrusions are adapted to extend;
   (d) said unit holder including means engaging said walls to urge them together to clamp said units in said predetermined spaced relationship;
   (e) means engaging said unit holder for retraction from said unit positioner structure to free said protrusions from positioning relationship with said units; and
   (f) means for plugging said apertures preparatory to the introduction of the cementatory bonding substance to the spaces separating said units.

23. The invention as defined by claim 22, wherein said plugging means includes plugs which are end portions of said protrusions.

24. The invention as defined by claim 22, wherein said plugging means includes a portion of resilient material disposed on the inner surface of the wall of said unit holder containing said apertures.

25. An apparatus for constructing masonries that include a plurality of masonry units joined by means of a cementatory bonding substance, said apparatus comprising:
   (a) a base means;
   (b) a unit positioner structure that includes a coursing adapter structure and a plurality of horizontally extending protrusions mounted on said coursing adapter structure for positioning masonry units in the form of a vertical wall and in predetermined spaced relationship, with said unit positioner structure being supported by said base means;
(c) a unit holder adapted to surround said masonry units and being supported by said base means, said unit holder having a plurality of relatively moveable walls, one of said walls having apertures through which said protrusions are adapted to extend;
(d) said unit holder including means engaging said walls to urge them together to clamp said units in said predetermined spaced relationship; and
(e) means engaging said coursing adapter structure for retracting said protrusions from positioning engagement with said units after said units are clamped by said unit holder.

26. An apparatus for constructing masonries that include a plurality of masonry units joined by means of a cementatory bonding substance, said apparatus comprising:
(a) a base means;
(b) a unit positioner structure that includes a coursing adapter structure and a plurality of horizontally extending protrusions mounted on said coursing adapter structure for positioning masonry units in the form of a vertical wall and in predetermined spaced relationship, with said unit positioner structure being supported by said base means;
(c) a unit holder adapted to surround said masonry units and being supported by said base means, said unit holder having a plurality of relatively moveable walls, one of said walls having apertures through which said protrusions are adapted to extend;
(d) said unit holder including means engaging said walls to urge them together to clamp said units in said predetermined spaced relationship;
(e) means engaging said unit holder for retraction from said unit positioner structure to free said protrusions from positioning relationship with said units; and
(f) means for plugging said apertures preparatory to the introduction of the cementatory bonding substance to the spaces separating said units.

27. An apparatus for constructing masonries that include a plurality of masonry units joined by means of a cementatory bonding substance, said apparatus comprising:
(a) a base means;
(b) a unit positioner structure that includes a coursing adapter structure and a plurality of horizontally extending protrusions mounted on said coursing adapter structure for positioning masonry units in the form of a vertical wall and in predetermined spaced relationship, with said unit positioner structure being supported by said base means;
(c) a unit holder adapted to surround said masonry units and being supported by said base means, said unit holder having a plurality of relatively moveable walls, one of said walls having apertures through which said protrusions are adapted to extend;
(d) said unit holder including means engaging said walls to urge them together to clamp said units in said predetermined spaced relationship;
(e) means engaging said coursing adapter structure for retracting said protrusions from positioning engagement with said units after said units are clamped by said unit holder;
(f) plug support means attached to said apparatus on the exterior of said walls and facing the wall containing said apertures;
(g) plugging means secured to said plug support means; and
(h) means engaging said plug support means for moving said plugging means into sealing engagement with said apertures after said protrusions are retracted.

28. The invention as defined by claim 27, wherein said coursing adapter structure is a vertically extending wall having apertures that are adapted to receive said protrusions, said apertures being spaced vertically and being of a sufficient number to permit varied placements of said protrusions so that said structure may be adjusted to accommodate units of a different but standard thickness.

29. The invention as defined by claim 27, wherein said coursing adapter structure is in the form of a box having apertures spaced vertically along at least one side thereof and of sufficient number to permit varied placements of said protrusions so that said structure may be adjusted to accommodate units of a different but standard thickness.

30. The invention as defined by claim 27, wherein said plug support means is a vertically slidable and apertured wall, and wherein said plugging means is a resilient material that covers one surface of said vertically slidable wall and faces the exterior of the wall of said unit holder that contains said apertures, said plugging means having solid portions located vertically above and below and adapted to seal the apertures of said holder.

31. The invention as defined by claim 27, wherein said plugging means are a plurality of plugs with end portions of resilient material that abut and seal the apertures of said unit holder.

32. An apparatus for constructing masonries that include a plurality of masonry units joined by means of a cementatory bonding substance, said apparatus comprising:
(a) a base means;
(b) a unit positioner structure that includes a coursing adapter structure and a plurality of horizontally extending protrusions mounted on said coursing adapter structure for positioning masonry units in the form of a vertical wall and in predetermined spaced relationship, with said unit positioner structure being supported by said base means;
(c) a unit holder adapted to surround said masonry units and being supported by said base means, said unit holder having a plurality of relatively moveable walls, one of said walls having apertures through which said protrusions are adapted to extend;
(d) said unit holder including means engaging said walls to urge them together to clamp said units in said predetermined spaced relationship;
(e) means engaging said unit holder for retraction from said unit positioner structure to free said protrusions from positioning relationship with said units;
(f) plug support means attached to said apparatus on the exterior of said walls and facing the wall containing said apertures;
(g) plugging means secured to said plug support means; and
(h) means engaging said plug support means for moving said plugging means into sealing engagement with said apertures after said protrusions are retracted.

33. The invention as defined by claim 32, wherein said coursing adapter structure is a vertically extending wall having apertures that are adapted to receive said protrusions, said apertures being spaced vertically and being of a sufficient number to permit varied placements of said protrusions so that said structure may be adjusted to accommodate units of a different but standard thickness.

34. The invention as defined by claim 32, wherein said coursing adapter structure is in the form of a box having apertures spaced vertically along at least one side thereof and of a sufficient number to permit varied placements of said protrusions so that said structure may be adjusted to accommodate units of a different but standard thickness.

35. The invention as defined by claim 32, wherein said plug support means is a vertically slidable and apertured wall, and wherein said plugging means is a resilient material that covers one surface of said vertically slidable wall and faces the exterior of the wall of said unit holder that contains said apertures, said plugging means having solid portions located vertically above and below and adapted to seal the apertures of said holder.

36. The invention as defined by claim 32, wherein said plugging means are a plurality of plugs with end portions of resilient material that abut and seal the apertures of said unit holder.

References Cited by the Examiner

UNITED STATES PATENTS

| 1,723,345 | 8/1929 | Green | 249—83 |
| 2,464,051 | 3/1949 | Morin | 249—83 |
| 3,231,646 | 1/1966 | Conder et al. | 264—35 |
| 3,242,549 | 3/1966 | Boeglen | 249—91 |

J. SPENCER OVERHOLSER, *Primary Examiner.*

R. D. BALDWIN, *Assistant Examiner.*